United States Patent [19]

Rostaing et al.

[11] Patent Number: 4,770,231

[45] Date of Patent: Sep. 13, 1988

[54] HEAT RECOVERY PROCESS IN AN ISOTOPIC EXCHANGE INSTALLATION BETWEEN A LIQUID AND A GAS AND AN INSTALLATION PERFORMING THIS PROCESS

[75] Inventors: Michel Rostaing, Meylan; Etienne Roth, Sevres, both of France

[73] Assignee: Commissariat a l'Energie Atomique, France

[21] Appl. No.: 810,707

[22] Filed: Dec. 19, 1985

[30] Foreign Application Priority Data

Jan. 4, 1985 [FR] France ............................. 85 00089

[51] Int. Cl.$^4$ .......................... B01D 3/00; F28D 21/00
[52] U.S. Cl. .......................................... 165/1; 165/47; 165/104.31; 165/909; 203/22; 203/27; 422/200; 422/903
[58] Field of Search .............................. 203/22, 25, 27; 423/648 A; 165/1, 47, 909; 422/200, 903

[56] References Cited

U.S. PATENT DOCUMENTS 3,907,509  9/1975  Spevack .
3,940,473  2/1976  Spevack .
4,032,412  6/1977  Hoppe et al. ...................... 203/22
4,192,847  3/1980  Spevack .
4,258,006  3/1981  Flockenhaus et al. ............ 422/200

FOREIGN PATENT DOCUMENTS 2306004  10/1976  France .

Primary Examiner—Albert W. Davis, Jr.

[57] ABSTRACT

The invention relates to a process for recovering heat in an isotopic exchange installation between a liquid and a gas and to an installation for performing this process. The liquid and gas are present in co-current in at least one isotopic exchange reactor, the liquid being vaporized at the inlet of each reactor and condensed during the cooling of the vapor and gaseous phases at the outlet of each reactor. This process is characterized by the recovery of the heat extracted from the vapor and gaseous phases during the cooling at the outlet of each isotopic exchange reactor and by using the thus recovered heat for contributing to the vaporization of the liquid and to the preheating of the gas at the inlet of another isotopic exchange reactor of the installation. The invention applies to a tritium extraction and/or production installation, as well as to the extraction of a isotope from hydrogen.

3 Claims, 4 Drawing Sheets

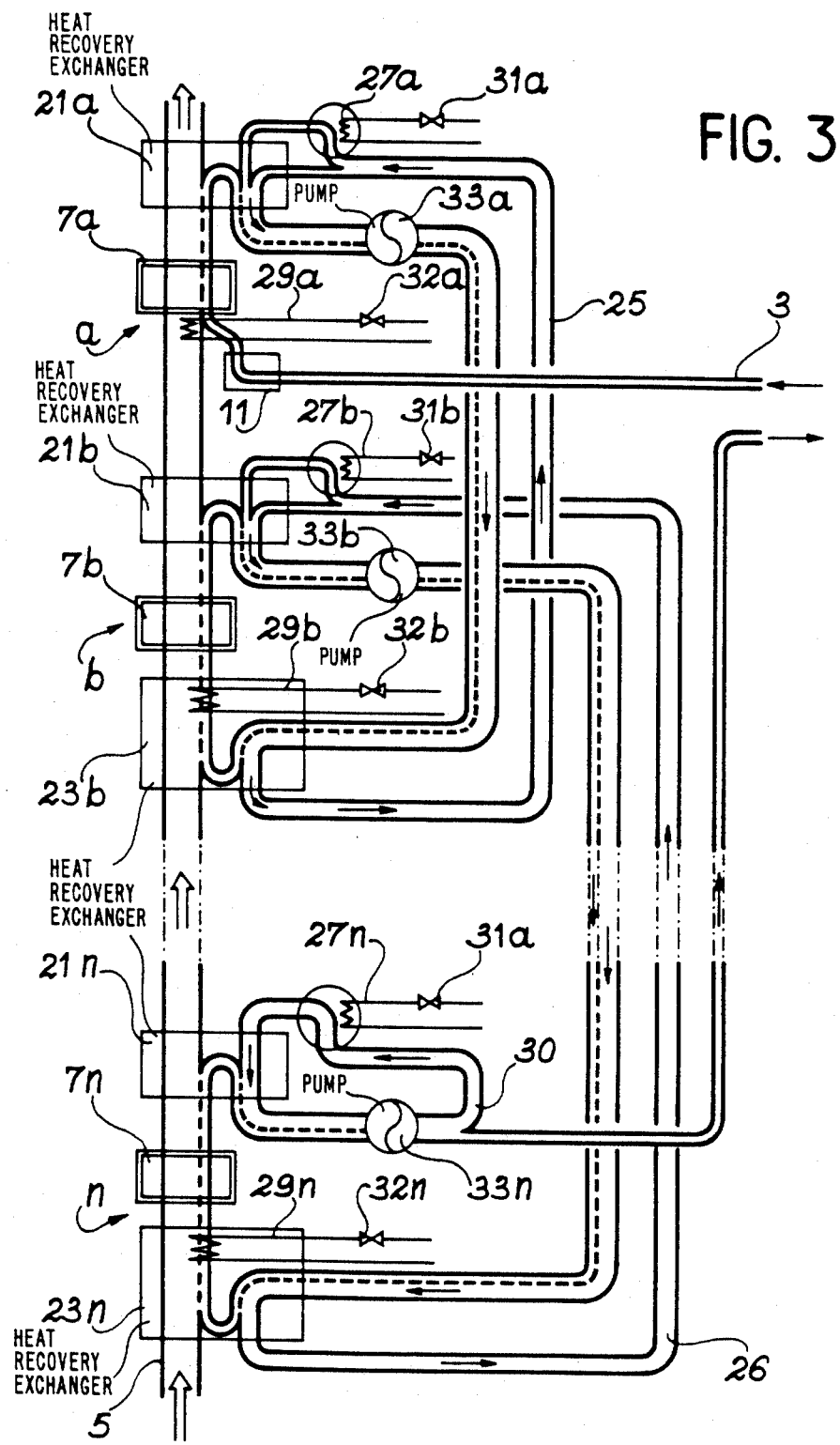

HEAT RECOVERY PROCESS IN AN ISOTOPIC EXCHANGE INSTALLATION BETWEEN A LIQUID AND A GAS AND AN INSTALLATION PERFORMING THIS PROCESS

BACKGROUND OF THE INVENTION

The present invention relates to a process for recovering heat in an isotopic exchange installation between a liquid and a gas and an installation performing said process. In more particularly applies to an installation for the extraction of tritium from heavy water $D_2O$ or light water $H_2O$ used as a moderator of a nuclear reactor or as a reprocessing plant effluent, using a gas such as deuterium or hydrogen. It can also apply to the extraction or separation of an isotope from hydrogen.

Tritium is radio active and must be extracted from the light or heavy water in which it is produced by a nuclear reaction between neutrons and atoms of deuterium, deuterium being itself an isotope of the hydrogen atom.

It is possible to extract the titrium from the water to be treated in accordance with a process of the type described in French pat. No. 1 526 867, filed on Aug. 9, 1966 in the name of the C.E.A. According to the known process (cf FIG. 1a), there is a a continuous branching off of a fraction of the water contained in a nuclear reactor or the like 1. This fraction 3 is subject to an isotopic exchange reaction with a gas 5, such as deutrium or hydrogen in order to lower the titrium content of the water. This exchange takes place in an isotopic exchange reactor 7, the complete isotopic exchange installation comprising one or more such reactors arranged in series, as is shown in FIG. 1a, where there are three stages a, b, c.

In order for the isotopic exchange reaction to take place, the water must be vaporized before entering each reactor 7 by a vaporizer 11. A cooler 13 at the outlet of each reactor 7 separates the two phases and condenses the vapor and cools the gas. The gas is in co-current with the water to be treated in each reactor 7, but in counter-current in the overall installation. The tritium-enriched gas is then recycled in a distillation installation 9, before being passed to isotopic exchange reactor 7.

FIG. 1b shows the MacCabe and Thiele diagram corresponding to the installation of FIG. 1a with the tritium content of the gas on the ordinate and of the liquid on the abscissa. The water initially having a tritium content $x_o$ reacts in a first reactor with the gas having a content $y_2$, so as to give post-exchange balanced phases of contents $x_1$ and $y_1$ respectively. The water with a tritium content $x_1$ at the outlet from the first reactor 7 is contacted in the second reactor 7 with the gas having a content $7_3$ in order to give balanced phases with contents $x_2$ and $y_2$ respectively. The repetition of these operations in the other reactor or reactors 7 makes it possible to lower the tritium content of the water to the desired value.

In this type of isotopic exchange installation the number of stages, e.g. three stages, and the flow rates are generally such that heat economy problems do not arise. However, when there are numerous stages and high flow rates, the energy costs of the installation are high and heat recovery problems occur.

SUMMARY OF THE INVENTION

The problem of the invention is to obviate this disadvantage and more particularly provide an apparatus making it possible to recover heat in each stage of an isotopic exchange installation.

More specifically, the present invention relates to a process for the recovery of heat in an isotopic exchange installation between a liquid and a gas in co-current in at least one isotopic exchange reactor, the liquid being vaporized on entering each reactor and condensed to form a condensate during the cooling of the vapor and gaseous phases on leaving each reactor. This process makes it possible to recover the heat extracted from the vapor and gaseous phases during cooling at the outlet of each isotopic exchange reactor and to utilize the thus recovered heat to contribute to the vaporization of the liquid on entering an isotopic exchange reactor of the installation. With the outlet of each isotopic exchange reactor corresponds the inlet of the same or another reactor with which it exchanges heat.

Advantageously the gas is heated at the inlet of an isotopic exchange reactor on the basis of the heat recovered at the outlet of a reactor in the installation.

According to an embodiment, use is made of the heat recovered at the outlet of a reactor in order to contribute to the vaporization of the liquid and to the heating of the gas at the inlet of said same reactor.

According to another embodiment, the heat is recovered at the outlet from each reactor by indirect heat exchange between the vapor and gaseous phases on the one hand and the cold gas and liquid on the other.

According to a variant of the process, the heat is recovered at the outlet from each reactor in order to contribute to the vaporization of the liquid and to the heating of the gas at the inlet of another reactor.

According to a preferred embodiment, the heat and condensate are recovered at the outlet of each reactor by direct exchange between the vapor and gaseous phases on the one hand and an auxiliary liquid on the other, in order that the latter transfers by direct exchange heat and condensate to the inlet of a lower reactor which has to be supplied by a liquid with the same isotopic abundance as that of the condensate being transferred.

According to another embodiment, heat is recovered at the outlet of each reactor by indirect heat exchange between the vapor and gaseous phases on the one hand and an auxiliary liquid transferred the heat to the inlet of an upper reactor by direct heat exchange on the other.

The invention also relates to a heat recovery apparatus for performing the process comprising at least one isotopic exchange reactor traversed in co-current by a liquid and a gas, means for vaporizing the liquid and heating the gas at the inlet of each reactor and means for cooling the vapor and gaseous phases at the outlet of each isotopic exchange reactor, whereby part of the means for vaporizing and heating on the one hand and cooling on the other is constituted by heat exchangers and means for transferring heat from the outlet of an isotopic exchange reactor of the installation to the inlet of an isotopic exchange reactor of the installation.

BRIEF DESCRIPTION OF THE DRAWINGS

The invention is described in greater detail hereinafter relative to non-limitative embodiments and the FIGS. 2 to 4, following FIGS. 1a and 1b and wherein show:

FIG. 3. a multistage isotopic exchange installation equipped with means for recovering heat by direct heat exchange.

DETAILED DESCRIPTION OF THE PREFERRED EMBODIMENTS

Figure 1A:
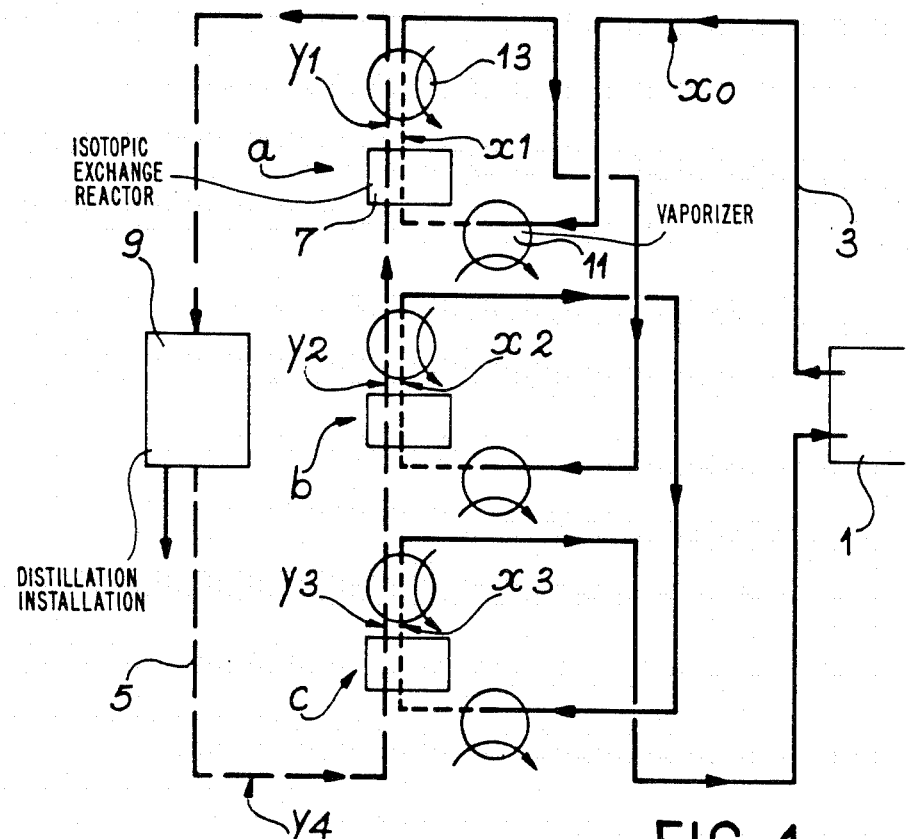
FIGS. 1a and 1b, already described, respectively a prior art isotopic exchange installation and the corresponding Mac Cabe and Thiele diagram with the tritium content of the gas on the ordinate and of the liquid on the abscisse.
Figure 1B:
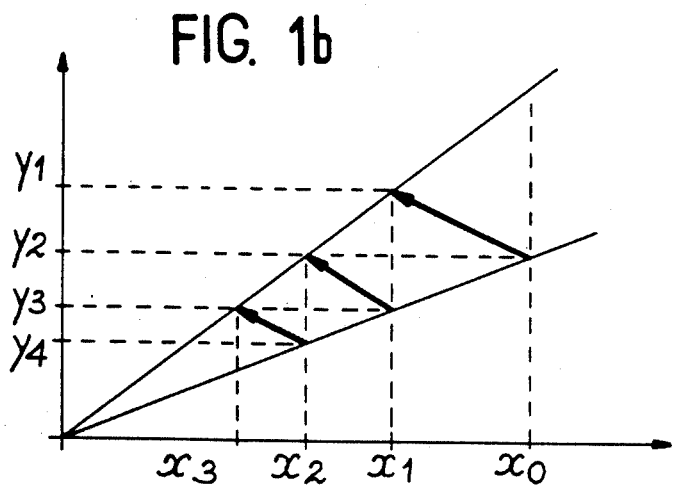
Figure 2:
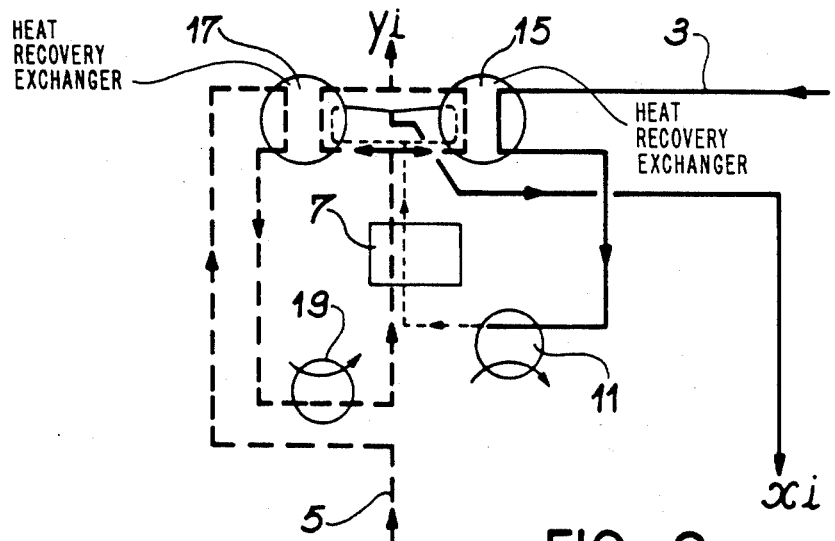
FIG. 2. a single stage isotopic exchange installation equipped with means for recovering heat by indirect heat exchange.

FIG. 2. shows a single stage isotopic exchange installation comprising in per se known manner a reactor 7 in which the water to be treated, vaporized by a heating system 11 is contacted with the gas heated by a heating system 19. These two heating systems 11 and 19 can be formed by any known means.

According to the invention, systems 11 and 19 are merely used for providing the extra heat required for the vaporization of the water and the heating of the gas, the preheating of these two fluids being performed by two indirect heat recovery exchangers 15, 17. The latter are placed at the outlet of the isotopic exchange reactor 7, from which the two phases present are split into two. Part of the gas and the vaporized liquid passes through heat exchanger 15 and transfers the heat to the water, in order to preheat the latter before it is vaporized in 11. The other part of the gas and the vaporized liquid traverses a second exchanger 17 in contact with the gas, in order to preheat the latter before it traverses the heating system 19.

The two phases leaving the reactor are cooled on one side by the cold gas passing into exchanger 17 and on the other side by the cold liquid passing into exchanger 15. The condensed water $x_i$ and the cooled gas $y_i$ leaving the stage in isotopic equilibrium can thus be separated without any supply of external energy. Moreover, the cold water passing into the exchanger 15 and the gas passing into the exchanger 17 are preheated in contact of the two phases leaving the isotopic exchange reactor 7, so that the heat supply necessary for vaporizing said water and heating said gas in systems 11 and 19 at the reactor inlet is reduced.

FIG. 3 shows a multistage isotopic exchange installation a, b . . . n, with n being a positive integer, comprising in per se known manner reactor 7a, 7b . . . 7n, in which the water vaporized by heating systems 29a, 29 . . 29n is contacted in co-current with the gas heated by the same system. These heating systems can be constituted by any known means and are merely used for providing the heat supply necessary for the vaporization of the water and for heating the gas at the inlet to each reactor. According to the invention, these two fluids are preheated via heat recovery exchangers 21a, 21b . . . 21n and 23b . . . 23n in direct contact and by transfer loops 25, 26, etc. These heat recovery exchangers 21a, 21b . . . 21n and 23b . . . 23n are constituted by heat exchange columns.

The heat recovery and condensation columns 21a, 21b . . . 21n are placed at the outlet of the reactors and ensure the condensation of the vaporized liquid and the cooling of the gas at the outlet of each reactor. The reheating and saturation columns 23b . . . 23n are placed at the inlet of reactor 7b . . . 7n and ensure the vaporization of the liquid and the heating of the gas at the inlet of said reactors. The heat transfer between exchange columns 21a . . . 21n and 23b . . . 23n in ensured by loops 25, 26, etc in which circulates a liquid from the liquid to be treated.

The liquid of loops 25, 26, etc mixes with the vapor phase, which condenses in columns 21a, 21b . . . 21n. All the liquid is then passed through loops 25, 26, transferring the heat recovered at the outlet of one stage to the inlet of a lower stage, as well as the liquid to be treated at the corresponding isotopic abundance.

The heat carried by loops 25, 26, etc is transferred to the reheating and saturation columns 23b . . . 23n, in which the gas entering the stages is reheated and part of the liquid from the loops is vaporized. The vaporization of the liquid entering the upper stage of the installation is realised by means of a conventional heating system 11. In the same way, a loop 30 associated with the lower stage only ensures the heat transfer between the column 21n associated with said stage and a conventional cooling system 27n.

As the recovery is not total, it is necessary on each loop for there to be additional heat (heating systems 29a, 29b . . . 29n) and additional cold (systems 27a, 27b . . . 27n). The heating systems 29a, 29b . . . 29n are constituted by heating element, such as bundles of vapor tubes or electric elements, e.g. placed in the upper part of the reheating and saturation columns 23b . . . 23n.

The cooling system 27a, 27b . . . 27n are more particularly constituted by cold exchangers containing a liquid from an auxiliary cooling source. These systems are e.g. placed in the upper part of the recovery and condensation columns 21a, 21b . . . 21n. The different columns 21a, 21b . . . 21n and 23 . . . 23b . . . 23n can be superimposed, either in pairs, or in a larger number, if this construction leads to greater economies.

The thermal conditions (temperature, heat quantity transferred are identical in all the condensation columns 21a, 21b . . . 21n. This also applies to the reheating and saturation columns 23i b, . . . 23n.

At each stage, pumps 33a, 33b . . . 33n ensure the circulation of the liquid to be treated and the liquid ciculating in loops 25, 26 and 30. Regulating valves 31a, 31b . . . 31n and 32a, 32b . . . 32n placed in the primary circuit of each heat exchanger 27a, 27b . . . 27n and 29a, 29b . . . 29n ensure the regulation of the extra heat and cold supplied.

Figure 4:
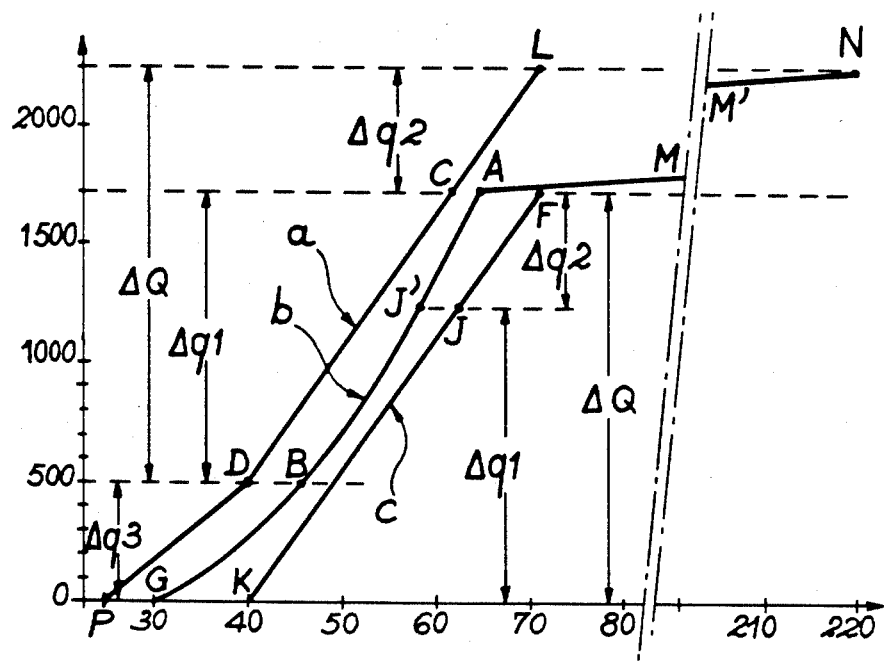
FIG. 4. the variations of the total heat associated with 1 kg of gas in kcal as a function of the temperature in degrees C and at atmospheric pressure, during heat recovery by direct exchange according to a process according to the invention, curves a, b and c respectively representing the recovery of heat performed at the outlet of one isotopic excahnge stage, the evolution of the liquid - gas mixture during said exchange and the restoration of heat at the inlet of an isotopic exchange stage.

The graph of FIG. 4 shows the variations of the total heat associated with one kg of $H_2$ in kcal, corresponding to the heat required for raising 1 kg of gas to the considered temperature and for saturating the gas at this temperature by heating the liquid, as a function of the temperature in degrees C, during heat recovery by direct heat exchange in accordance with a process according to the invention.

Curve a represents the heat recoveries performed at the outlet of an isotopic exchange stage. Curve b represents the evolution of the liquid - gas mixture during said exchange and finally curves c represent the heat restoration affected at the inlet of an isotopic exchange stage.

According to this diagram, at the inlet of each reactor, the previously vaporized water and gas are heated up to a temperature of 220° C. (point N) corresponding to the isotopic exchange temperature of $H_2$ with tritium-containing light water. Beyond point A shown in the graph, i.e. AMM'N, the gas and vapor behave like a conventional gaseous phase with a substantially constant mean specific heat.

The gas and water vapor are then cooled at the outlet of the isotopic exchange reactor in contact with a liquid counter-current and evolving in accordance with points N, M', M, A, B of the graph and whilst transferring heat to the heat transfer liquid circulating in the corresponding transfer loop. Thus, this liquid passes from D to L, i.e. from the temperature $t_D = 40°$ C. to that of $t_L = 71.5°$ C. The liquid firstly absorbs the heat quantity $\Delta q_1$ from D to C given of by a the gas and vapor which condenses, then $\Delta_{q2}$ from C to L given of by the gaseous phases passing from 220° to 65° C.

The slope DC is determined by the flow rate of the liquid, which must always be at a lower temperature than that of the gaseous phase. Moreover by translation of the points of D to K corresponding to the temperature of 40° C. and from C to J corresponding to the temperature of 62.5° C., an operating line of the heat transfer loop is obtained enabling the liquid to transfer the heat quantity $\Delta q_1$ to the gas whilst reheating it and saturating it from G to J' corresponding to the temperatures of 30° and 50° C. Segment DC determines the flow rate $1_B$ of the loop: $1_B = (\Delta q_1)/t_C - t_B)$ per kg of $H_2$. The heat quantity $q_2$ is restored in the saturation and reheating column in accordance with points FJ.

Thus, the total heat recovery and restoration are:

$$\Delta Q = \Delta q_1 + \Delta q_2$$

The losses $q_3$ correspond to the extra heat and cold supplied, with the heat quantities $+\Delta q_3$ supplied by the vaporizer and $-\Delta q_3$ supplied by the cooler necessary for bringing the gas and water to be treated from ambient temperature to a temperature of 40° C. in the example described.

In the example described hereinbefore, the order of magnitude of the heat recovery given by the relation $(\Delta Q)/(\Delta Q + \Delta q^3)$ is approximately 77%.

Figure 5:
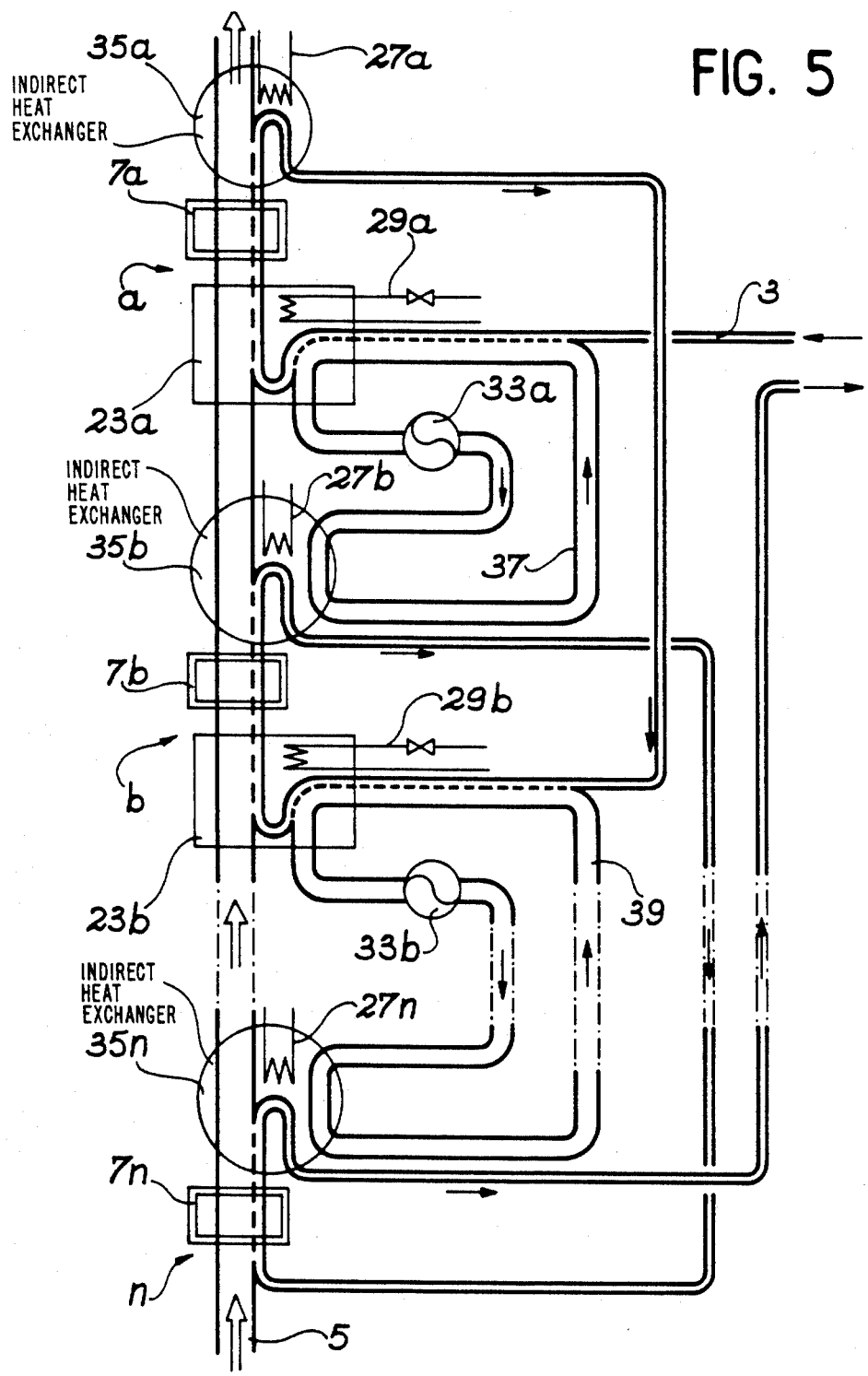
FIG. 5. a multistage isotopic exchange installation equipped with heat recovery means by mixed heat exchange.

FIG. 5 shows a multistage isotopic exchange installation a, b . . . n, with n being a positive integer, equipped with mixed heat exchange heat recovery means, i.e. involving direct and indirect heat exchange. The indirect heat exchangers 35a, 35b . . . 35n are placed at the outlet of the isotopic exchanger reactor 7a, 7b . . . 7n and the direct heat exchange columns 23a, 2b . . . 23(n−1) are placed at the inlet of reactor 7a, 7b . . . 7(n−1). Loops 37, 39 ensure the heat transfer from the outlet of an isotopic exchange stage to the inlet of a higher stage.

The liquid to be treated arrives in the direct exchange columns 23a, 23b . . . 23(n−1) after mixing with the liquid of the loops 37, 39, etc previously heated in the indirect heat exchangers 35a, 35b . . . 35n. In said columns 23a, 23b . . . 23(n−1), part of the liquid is vaporized and the gas preheated. The rest of the liquid is transferred in loops 37, 39, etc to the indirect heat exchangers 35a, 35b . . . 35n at the outlet of the lower stages. In these indirect exchangers, the liquid of the loops cools the vapor - gas leaving the isotopic exchange reactors 7a, 7b . . . 7n and thus recovers the heat which it will then transfer again to the inlet of the upper stages 23a, 23b . . . 23(n−1). Pumps 33a, 33b . . . 33n ensures the circulation of the liquid.

As in the previously described heat recovery processes, additional heat supplies 29a, 29b etc are necessary for vaporizing the liquid and for heating the gas to the isotopic exchange temperature before these phases enter the isotopic exchange reactors 7a, 7b, whilst extra cooling supplies 27a, 27b . . . 27n are necessary for condensing the liquid at the outlet of the isotopic exchange stages.

The general configuration of a graph representing the variations of the total heat has a function of the temperature, corresponding to this heat recovery process by mixed heat exchange is equivalent to that shown in FIG. 4, except for the temperature and total heat quantity values.

The heat recovery in an isotopic exchange installation can take place by indirect, direct or mixed heat exchange. The heat recovery process by direct heat exchange is the most advantageous from the recovered heat quantity standpoint.

The heat recovery processes according to the invention permit greater heat economies in proportion to the increase in the size of the isotopic exchange installation, i.e. having a high flow rate and a large number of stages.

What is claimed is:

1. A process for the recovery of heat in an isotopic exchange installation between a liquid and a gas present in co-current, in at least two isotopic exchange reactors, the liquid being vaporized at the inlet of each, said at least two reactors and being condensed for forming a condensate during the cooling of the vapor and gaseous phases at the outlet of each reactor, wherein the heat extracted from the vapor and gaseous phases is recovered during cooling at the outlet of each said at least two isotopic exchange reactors and wherein the thus recovered heat is used for contributing to the vaporization of the liquid and for heating the gas at the inlet of said at least two isotopic exchange reactors of the installation, the heat recovered at the outlet of each reactor being used at the inlet of a reactor.

2. A process according to claim 1, wherein the heat and condensate are recovered at the outlet of each reactor by direct exchange between the vapor and gaseous phases on the one hand and an auxiliary liquid on the other, in order that the latter transfers by direct exchange heat and condensate to the inlet of a lower reactor, which is to be supplied by a liquid with the same isotopic abundance as that of the condensate being transferred.

3. An isotopic exchange installation comprising at least two isotopic exchange reactors each traversed in co-current by a liquid and a gas heating means vaporizing the liquid and heating the gas at the inlet of each reactor, and cooling means for condensing the vapor and cooling the gas at the outlet of each reactor, wherein each cooling means comprises a first heat exchanger and each heating means comprises a second heat exchanger, said first heat exchanger of said, at least two isotopic exchange reactors being connected to the second heat exchanger of another isotopic exchange reactor by a heat transfer loop in a manner that the heat extracted from the vapor and gas during their cooling in said first heat exchangers is recovered and utilized in contributing to the vaporization of the liquid and for heating the gas, by said second heat exchanger.

* * * * *